United States Patent
Dumitru et al.

(10) Patent No.: US 9,202,046 B2
(45) Date of Patent: Dec. 1, 2015

(54) SYSTEMS AND METHODS FOR EXECUTING ARBITRARY APPLICATIONS IN SECURE ENVIRONMENTS

(71) Applicant: Bitdefender IPR Management Ltd., Nicosia (CY)

(72) Inventors: Bogdan C. Dumitru, Bucharest (RO); Sandor Lukacs, Floresti (RO); Dan H. Lutas, Cluj-Napoca (RO); Raul V. Tosa, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 14/195,132

(22) Filed: Mar. 3, 2014

(65) Prior Publication Data

US 2015/0248554 A1    Sep. 3, 2015

(51) Int. Cl.
*G06F 9/455* (2006.01)
*G06F 21/56* (2013.01)
*G06F 21/53* (2013.01)

(52) U.S. Cl.
CPC ............ *G06F 21/53* (2013.01); *G06F 9/45545* (2013.01); *G06F 21/56* (2013.01)

(58) Field of Classification Search
CPC ..... G06F 21/60; G06F 9/45558; G06F 21/53; H04L 63/08
USPC .................................................. 726/1; 718/1
See application file for complete search history.

(56) References Cited

U.S. PATENT DOCUMENTS

| | | | |
|---|---|---|---|
| 6,182,186 B1 * | 1/2001 | Daynes | 710/200 |
| 7,647,589 B1 | 1/2010 | Dobrovolskiy et al. | |
| 8,302,101 B2 | 10/2012 | Bissett et al. | |
| 8,326,943 B2 | 12/2012 | Chinta et al. | |
| 8,424,078 B2 | 4/2013 | Accapadi et al. | |
| 8,516,486 B2 | 8/2013 | Meketa | |
| 2007/0174910 A1 | 7/2007 | Zachman et al. | |
| 2009/0125902 A1 | 5/2009 | Ghosh et al. | |
| 2010/0023942 A1 | 1/2010 | Sheu et al. | |
| 2010/0122343 A1 | 5/2010 | Ghosh et al. | |
| 2011/0246698 A1 | 10/2011 | Warrier et al. | |

(Continued)

OTHER PUBLICATIONS

Duran-Limon et al., (Using lightweight virtual machines to achieve resource adaptation in middleware, IET Softw., 2011, vol. 5, Iss. 2, pp. 229-237).*

(Continued)

*Primary Examiner* — Saleh Najjar
*Assistant Examiner* — Oleg Korsak
(74) *Attorney, Agent, or Firm* — Law Office of Andrei D Popovici, PC

(57) ABSTRACT

Described systems and methods allow protecting a host system, such as a computer system or smartphone, from malware such as viruses, exploits, and rootkits. In some embodiments, a hypervisor executes at the highest processor privilege level and displaces other software to a guest virtual machine (VM). A security application detects the launch of a target process within the guest VM. In response to the launch, the hypervisor instantiates a process VM isolated from the guest VM, and relocates the target process to the process VM. In some embodiments, when the relocated target process attempts to access a resource, such as a file or registry key, an instance of the respective resource is fetched on-demand, from the guest VM to the respective process VM. Executing the target process within an isolated environment helps to contain malware to the respective environment.

22 Claims, 9 Drawing Sheets

(56) References Cited

U.S. PATENT DOCUMENTS

| | | |
|---|---|---|
| 2011/0296412 A1 | 12/2011 | Banga et al. |
| 2011/0296487 A1* | 12/2011 | Walsh .............................. 726/1 |
| 2012/0158396 A1 | 6/2012 | Douceur et al. |
| 2012/0174096 A1 | 7/2012 | Conover |
| 2012/0198442 A1 | 8/2012 | Kashyap et al. |
| 2012/0227038 A1 | 9/2012 | Hunt et al. |
| 2013/0047160 A1 | 2/2013 | Conover |
| 2013/0055256 A1* | 2/2013 | Banga et al. ....................... 718/1 |
| 2013/0091557 A1 | 4/2013 | Gurrapu |
| 2013/0097603 A1* | 4/2013 | Amano et al. .................... 718/1 |
| 2013/0145463 A1 | 6/2013 | Ghosh et al. |
| 2013/0191924 A1 | 7/2013 | Tedesco et al. |
| 2013/0198747 A1 | 8/2013 | Larkin et al. |

OTHER PUBLICATIONS

Rutkowska, "How is Qubes OS different from . . . " The Invisible Things Lab's blog, Sep. 12, 2012.

Invincea, "Invincea FreeSpace for Enterprise Architects," Invincea White Paper, Oct. 28, 2013.

Bromium, "Bronnium vSentry: Defeat the Unknown Attack," Bromium White Paper, downloaded from bromium.com on Jan. 7, 2014.

Bromium, "Understanding Bromium Micro-virtualization for Security Architects," Bromium White Paper, downloaded from bromium.com on Jan. 7, 2014.

* cited by examiner

SYSTEMS AND METHODS FOR EXECUTING ARBITRARY APPLICATIONS IN SECURE ENVIRONMENTS

BACKGROUND

The invention relates to systems and methods for protecting a computer system from malware, and in particular systems and methods that use hardware virtualization technology.

Malicious software, also known as malware, affects a great number of computer systems worldwide. In its many forms such as computer viruses, worms, exploits, and rootkits, malware presents a serious risk to millions of computer users, making them vulnerable to loss of data and sensitive information, to identity theft, and to loss of productivity, among others.

A typical malware attack comprises malware exploiting a vulnerability of a software object, such as an application executing on a computer system or smartphone, to take control of the respective system in order to perform malicious activities, such as installing new software components, modifying existing software, carrying out illegitimate electronic communications with a remote computer system, and stealing sensitive information, among others. Malware may also attempt to interfere with anti-malware software executing on the host system, for instance to incapacitate, delete, or overwrite anti-malware software.

Various software solutions may be used to detect malware, and/or to prevent such malware from infecting a host system. Some of these solutions employ hardware virtualization techniques, wherein the host system is configured to run a set of virtual machines, each such virtual machine comprising an abstraction (e.g., software emulation) of the host system hardware, and behaving in many ways as the physical host. In one example, anti-malware components may execute in one virtual machine and protect software executing in another virtual machine. In another example, anti-malware software may execute in a layer below the protected virtual machine. Currently, there is a strong interest in developing other anti-malware solutions which take advantage of facilities offered by hardware virtualization technology.

SUMMARY

According to one aspect, a host system comprises at least one processor configured to execute a hypervisor. The hypervisor is configured to expose a guest virtual machine (VM) and in response to a launch of a target process within guest VM, to expose a process VM distinct from the guest VM. The hypervisor is further configured, in response to exposing the process VM, to relocate the target process from the guest VM to the process VM. In response to relocating the target process, and in response to an attempt by the target process to access a resource, the hypervisor is further configured to fetch the resource from the guest VM to the process VM.

According to another aspect, a method comprises employing at least one processor of a host system to execute a hypervisor, the hypervisor configured to expose a guest virtual machine (VM). The method further comprises, in response to a launch of a target process within the guest VM, employing the at least one processor to expose a process VM distinct from the guest VM, and in response to exposing the process VM, employing the at least one processor to relocate the target process from the guest VM to the process VM. The method further comprises, in response to relocating the target process, and in response to an attempt by the target process to access a resource, employing the at least one processor to fetch the resource from the guest VM to the process VM.

According to another aspect, a non-transitory computer readable medium stores instructions which, when executed, cause a host system comprising at least one processor to execute a hypervisor, the hypervisor configured to expose a guest virtual machine (VM). The hypervisor is further configured, in response to a launch of a target process within the guest VM, to expose a process VM distinct from the guest VM, and in response to exposing the guest VM, to relocate the target process from the guest VM to the process VM. The hypervisor is further configured, in response to relocating the target process, and in response to an attempt by the target process to access a resource, to fetch the resource from the guest VM to the process VM.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a process represents an instance of a computer program, wherein a computer program is a sequence of instructions determining a computer system to perform a specified task. Unless otherwise specified, a page represents the smallest unit of virtualized memory individually mapped to a physical memory of a host computer system. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
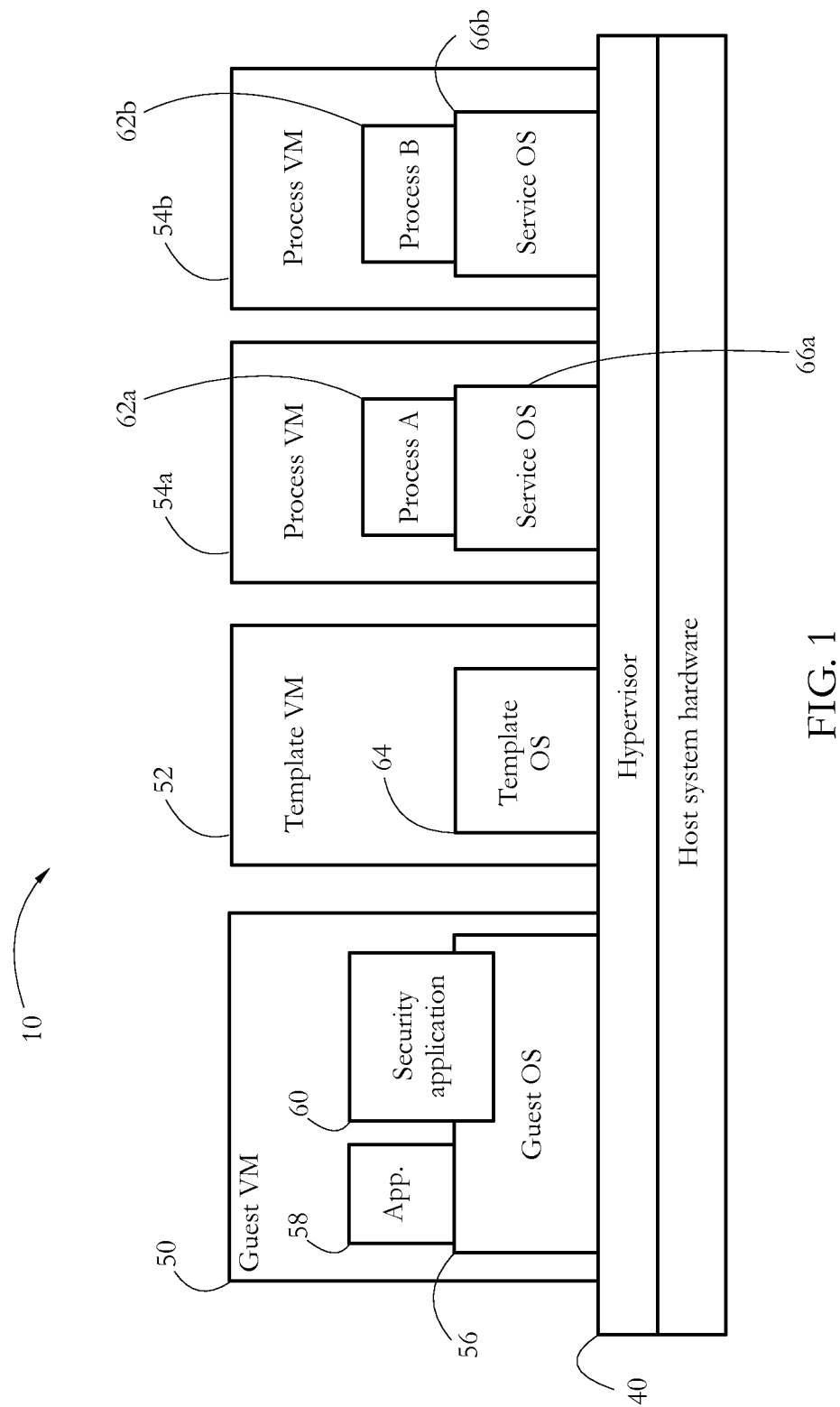
FIG. 1 shows an exemplary software configuration of a host system protected from malware according to some embodiments of the present invention.

FIG. 1 shows an exemplary configuration of a host system 10 protected from malware according to some embodiments of the present invention. Host system 10 may represent a corporate computing device such as an enterprise server, or an end-user device such as a personal computer, tablet computer, or smartphone, among others. Other exemplary host systems include entertainment devices such as TVs and game consoles, wearable computing devices, or any other electronic device having a memory and a processor, and supporting hardware virtualization. Host system 10 is configured by some embodiments of the present invention to execute a hypervisor 40, while hypervisor 40 is further configured to expose a guest virtual machine (VM) 50, at least one template VM 52, and a set of process VMs 54a-b.

Virtual machine 50 comprises an abstraction (e.g., a software emulation) of host system 10, the abstraction enabling VM 50 to execute a guest operating system (OS) 56 and/or other software applications, to receive input and to display output (e.g., a graphical user interface) from/to user of host system 10, and to carry out electronic communications with other entities over a computer network. In some embodiments, the user experience created by running software applications in the configuration of FIG. 1 may be indistinguishable from the user experience of running the respective software applications in a conventional computer system, in the absence of hardware virtualization. In other words, the user may be unaware that the respective applications execute within a virtual machine, as opposed to directly on the hardware platform of host system 10.

Hypervisor 40, also known in the art as a virtual machine monitor (VMM), comprises software which creates the virtual environment of VMs 50, 52, and 54a-b, an operation also known in the art of virtualization as exposing the respective VMs. To expose a virtual machine, software components of hypervisor 40 may create a plurality of virtual devices, each virtual device emulating the operation and functionality of a physical hardware device of host system 10, such as a processor or a memory controller, among others. Hypervisor 40 may further assign a set of virtual devices to each exposed VM, allowing the respective VM to operate as if it possessed a more-or-less complete set of hardware devices. Examples of popular hypervisors include the VMware ESXi™ from VMware Inc. and the open-source Xen hypervisor, among others.

Figure 2:
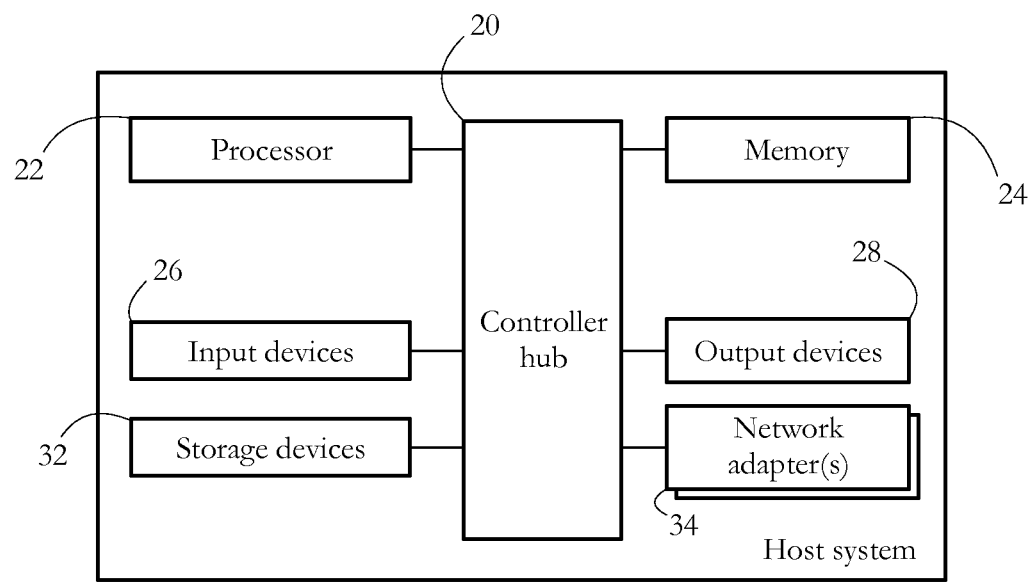
FIG. 2 shows an exemplary hardware configuration of the host system according to some embodiments of the present invention.

FIG. 2 shows an exemplary hardware configuration of host system 10, according to some embodiments of the present invention. FIG. 2 represents a computer system for illustrative purposes; other devices such as smartphones, tablet computers, game consoles, etc., may have a different configuration. In some embodiments, host system 10 comprises a processor 22, a memory unit 24, a set of input devices 26, a set of output devices 28, a set of storage devices 32, and a set of network adapter(s) 34, all interconnected by a controller hub 20.

In some embodiments, processor 22 comprises a physical device (e.g. multi-core integrated circuit) configured to execute computational and/or logical operations with a set of signals and/or data. In some embodiments, such logical operations are delivered to processor 22 in the form of a sequence of processor instructions (e.g. machine code or other type of software). Memory unit 24 may comprise volatile computer-readable media (e.g. RAM) storing data/signals accessed or generated by processor 22 in the course of carrying out instructions. Input devices 26 may include computer keyboards, mice, and microphones, among others, including the respective hardware interfaces and/or adapters allowing a user to introduce data and/or instructions into host system 10. Output devices 28 may include display devices such as monitors and speakers among others, as well as hardware interfaces/adapters such as graphic cards, allowing host system 10 to communicate data to a user. In some embodiments, input devices 26 and output devices 28 may share a common piece of hardware, as in the case of touch-screen devices. Storage devices 32 include computer-readable media enabling the non-volatile storage, reading, and writing of software instructions and/or data. Exemplary storage devices 32 include magnetic and optical disks and flash memory devices, as well as removable media such as CD and/or DVD disks and drives. Network adapter(s) 34 enable host system 10 to connect to a communication network and/or to other devices/computer systems.

Figure 3:
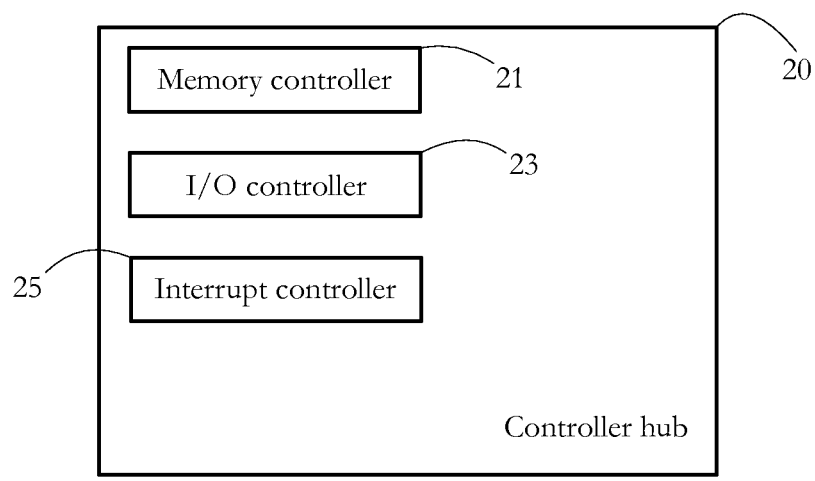
FIG. 3 illustrates exemplary hardware components of a controller hub according to some embodiments of the present invention.

Controller hub 20 represents the plurality of system, peripheral, and/or chipset buses, and/or all other circuitry enabling the communication between processor 22 and devices 24, 26, 28, 32, and 34. FIG. 3 shows exemplary components of controller hub 20, such as a memory controller 21, an input/output (I/O) controller 23, and an interrupt controller 25. Depending on hardware manufacturer, some or all of devices 21, 23, and 25 may be incorporated into a single integrated circuit, and/or may be integrated with processor 22. In some embodiments, some other devices, such as graphics adapters forming part of output devices 28, may be also integrated with processor 22.

Memory controller 21 may oversee communication between processor 22 and memory unit 24. In some embodiments, for instance using Intel® chipsets, memory controller 21 may comprise the northbridge. In other embodiments, for instance in smartphone hardware platforms designed according to the ARM® specification, memory controller 21 may comprise a memory management unit (MMU), among others. I/O controller 23 generically represents the circuitry and signal logic components enabling the data flow between processor 22 and peripheral devices, such as input, output, storage, and network devices, among others. In some embodiments, such as a typical computer chipset, I/O controller 23 includes the southbridge, peripheral component interconnect (PCI) bus and/or low pin-count (LPC) bus of a typical computer chipset. Interrupt controller 25 generically represents circuitry and logic configurable to manage interrupt signals transmitted between processor 22 and devices 24, 26, 28, 32, and 34, among others.

In some embodiments, guest VM 50 executes a guest operating system 56, a security application 60, and possibly other applications, generically represented by application 58. Such other applications may include word processing, image processing, media player, database, calendar, personal contact management, browser, gaming, voice communication, and data communication applications, among others. Guest OS 56 comprises software that provides an interface to the (virtualized) hardware of client VM 50, and acts as a host for computing applications 58-60. Guest OS 56 may comprise any widely available operating system such as Windows®, MacOS®, Linux®, iOS®, or Android™, among others.

In some embodiments, hypervisor 40 takes control of processor 22 at the most privileged level (e.g., VMXroot on Intel® platforms supporting virtualization, and also known as ring-1 or root mode). Guest OS 56 and applications such as 58 and 60 in FIG. 1 execute with lower processor privileges, for instance in kernel mode (ring 0) or user mode (ring 3). To restrict privileges of software executing within a VM, some embodiments may configure processor 22 to generate a processor event, such as an exception or a VM exit event, when software executing within the respective VM issues certain processor instructions, known in the art as privileged instructions. An attempt to execute a privileged instruction may then result in a suspension of execution of the respective software object, while control of processor 22 is transferred to hypervisor 40.

Figure 4:
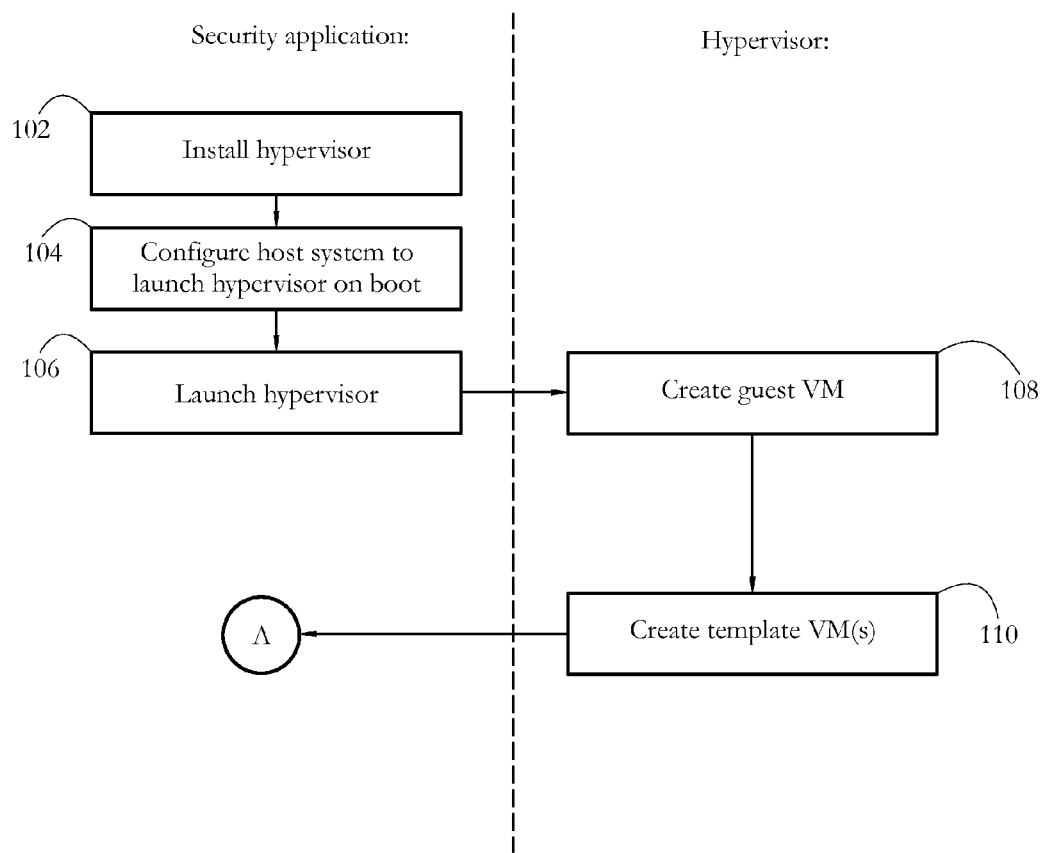
FIG. 4 shows an exemplary sequence of steps performed by the security application and/or hypervisor to set up malware protection according to some embodiments of the present invention.

Security application 60 is configured to protect host system 10 from malware, as shown in more detail below. In a typical delivery scenario, security application 60 is installed on a conventional host system still lacking a virtualization layer, wherein OS 56 directly controls the hardware components. Following installation, application 60 may proceed to set up malware protection, as illustrated by the exemplary sequence of steps in FIG. 4. In a step 102, application 60 may install hypervisor 40, and then, in a step 104, configure host system 10 to launch hypervisor 40 on boot. Hypervisor 40 is then launched into execution, taking control of processor 22 at the most privileged level. In some embodiments, steps 104-106 further include a set of operations designed to configure host system 10 to perform a measured launch of hypervisor 40. A measured launch is known in the art as manner of launching a software component while attesting the integrity of the respective component. An exemplary measured launch of hypervisor 40 uses the TXT® technology from Intel®, wherein hypervisor 40 is loaded into memory and a reference hash of the memory image of hypervisor 40 is computed and stored in a sealed storage hardware device, such as a trusted platform module (TPM) from Intel®. On subsequent launches, hypervisor 40 is loaded into memory and a hash of its memory image is compared to the stored reference hash. Hypervisor 40 is then launched into execution only when the hashes match, indicating that the loaded image is trustworthy.

Following launch, in a step 108, hypervisor 40 suspends execution of the OS and applications 58-60 and creates the virtual environment of guest VM 50. Creating guest VM 50 may include, among others, allocating memory, setting up memory mapping mechanisms, and setting up virtualized devices of guest VM 50 (such as a virtualized processor, virtualized storage, and virtualized network adapters). Virtual machines typically operate with a virtualized physical memory, i.e., a virtual representation of the actual, physical memory 24 of host system 10. Virtualized physical memory, also known as guest-physical memory, comprises a space of addresses, specific to each VM executing on host system 10, with parts of said space mapped to sections of physical memory 24 and/or of physical storage 32. In systems supporting virtualization, such mapping is known as a second level address translation (SLAT), and is typically achieved using dedicated data structures used by processor 22, such as extended page tables (EPT) on Intel platforms, or nested page tables (NPT) on systems having AMD processors. In such systems, virtualized physical memory is partitioned in units known in the art as pages, a page representing the smallest unit of virtualized physical memory individually mapped to physical memory via mechanisms such as EPT and/or NPT, i.e., mapping between physical and virtualized physical memory is performed with page granularity. All pages typically have a predetermined size, e.g., 4 kilobytes, 2 megabytes, etc. The partitioning of virtualized physical memory is usually configured by hypervisor 40. In some embodiments, hypervisor 40 also configures the EPT/NPT and therefore the mapping between physical memory and virtualized physical memory, for each VM executing on host 10.

Following the launch of hypervisor 40, OS 56 is presented with the virtualized memory space configured for guest VM 50, instead of physical memory space 24. In some embodiments, OS 56 further sets up a virtual memory space (also known in the art as a logical address space) and exposes the respective virtual memory space to an application such as applications 58 and/or 60 in FIG. 1. In such systems, OS 56 configures and maintains a mapping between such virtual memory spaces and the virtualized physical memory of guest VM 50, for instance using a page table mechanism. In some embodiments, virtual memory spaces configured by OS 56 are also partitioned into pages, wherein a page represents the smallest unit of virtual memory individually mapped to virtualized physical memory by OS 56 (virtual to virtualized physical memory mapping is performed with page granularity).

The present description occasionally refers to a memory domain of a virtual machine. In some embodiments, such a memory domain includes a virtualized physical memory space used by the respective VM and/or a virtual memory space used by an application executing within the respective VM. The memory domain may be embodied via memory mappings comprising virtual-to-virtualized-physical and/or virtualized-physical-to-physical address translations, for instance by configuring an EPT/NPT structure used to manage the respective VM.

Figure 7:
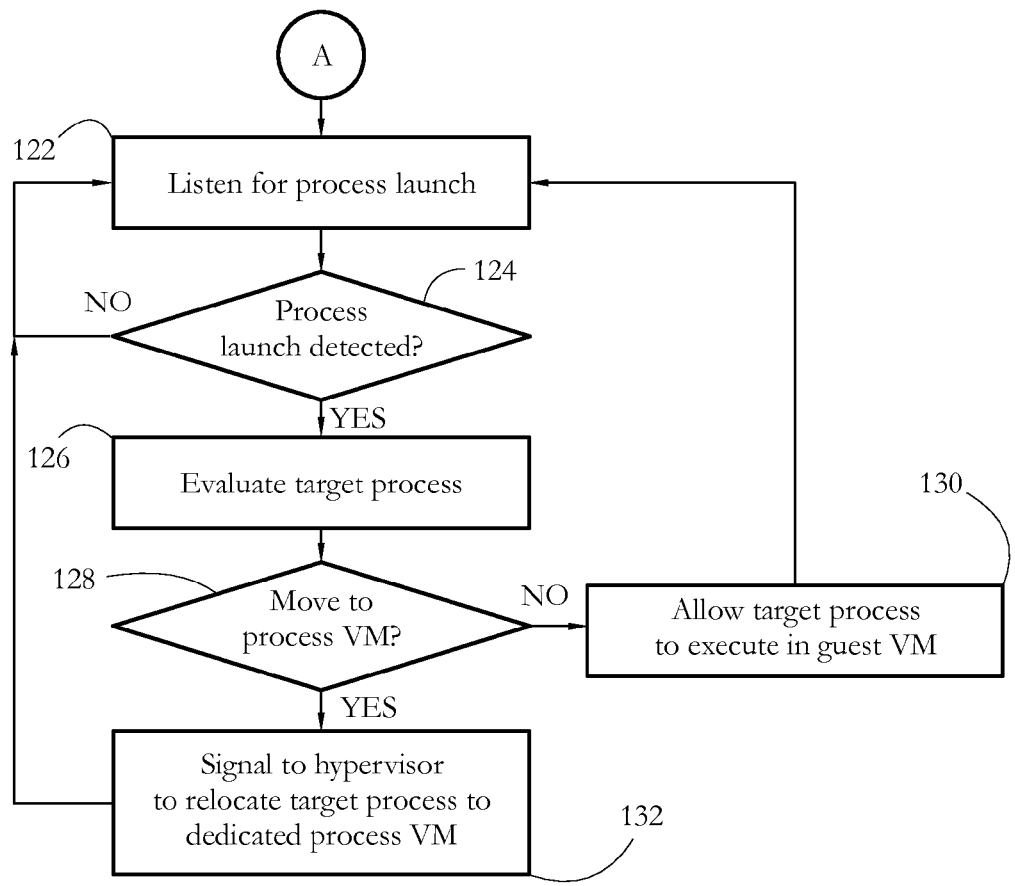
FIG. 7 shows an exemplary sequence of steps performed by components of the security application to manage execution of a target process according to some embodiments of the present invention.

In a step 110, hypervisor 40 may set up a set of template VMs, and then transfer control of processor 22 over to guest VM 50 for a sequence of steps starting with label A and illustrated in FIG. 7. In some embodiments, template VMs are virtual machines used as templates for creating process VMs 54a-b which will host various processes launched in guest VM 50, as described in detail below. In some embodiments, each template VM 52 includes a virtualized processor, virtualized memory, and may be configured with a range of other virtualized devices, such as virtualized input, output, storage, and network adapters. In an embodiment wherein VM 52 does not have a virtualized network adapter, access to physical network adapter(s) 34 may be interpreted and processed by hypervisor 40 as a resource request, as described below. In some embodiments, hypervisor 40 configures each template VM 52 with a memory space isolated from the memory space of other template VMs, and from the memory space of guest VM 52. Memory isolation may be implemented using any technique known in the art of virtualization.

Each template VM 52 is endowed with a template OS 64, which may be an instance of a popular OS such as Windows®, Linux®, or Android®, or may be a customized OS having a selected subset of the features of an off-the-shelf OS. Template OS 64 may be booted at installation (step 110), to ensure a low-latency instantiation of process virtual machines via cloning of the respective template VM. In some embodiments, step 110 instantiates a plurality of template VMs, each with a distinct configuration and/or set of features. In one such example, each template VM 52 may be configured to facilitate execution of a distinct category or class of processes. For instance, there may be one template VM used for creating process VMs configured to host Microsoft Office® applications, and a distinct template VM used for creating process VMs configured to host browser sessions. In such embodiments, in addition to template OS 64, template VM 52 may be configured with a set of template-specific libraries, frameworks, and/or services used by the respective category/class of processes. Such configurations may accelerate execution of the respective category of processes by already providing the respective VM with necessary resources, at the cost of maintaining a template with a relatively large footprint. In some embodiments, a distinct template VM 52 may be used to create process VMs configured to host generic or unknown-type processes. Such templates may be configured specifically for security purposes, and endowed with a minimal set of features. In some embodiments, resources (such as libraries, services, network access) needed by processes running in a VM cloned from such a template VM may be provided dynamically, upon request, as shown in detail below.

In some embodiments, some of the operations needed to create template VM 52 are carried out by components of security application 60 from within guest VM 50. In one such example, security application 60 installs template VM 52 from a disk file. In another example, hypervisor 40 may instantiate VM 52 by using guest VM 50 as a template. Hypervisor 40 may then allow security application 60 to modify VM 52, for instance by removing a set of components of guest OS 56 to produce template OS 64, and/or re-configuring other components of template VM 52.

Figure 5:
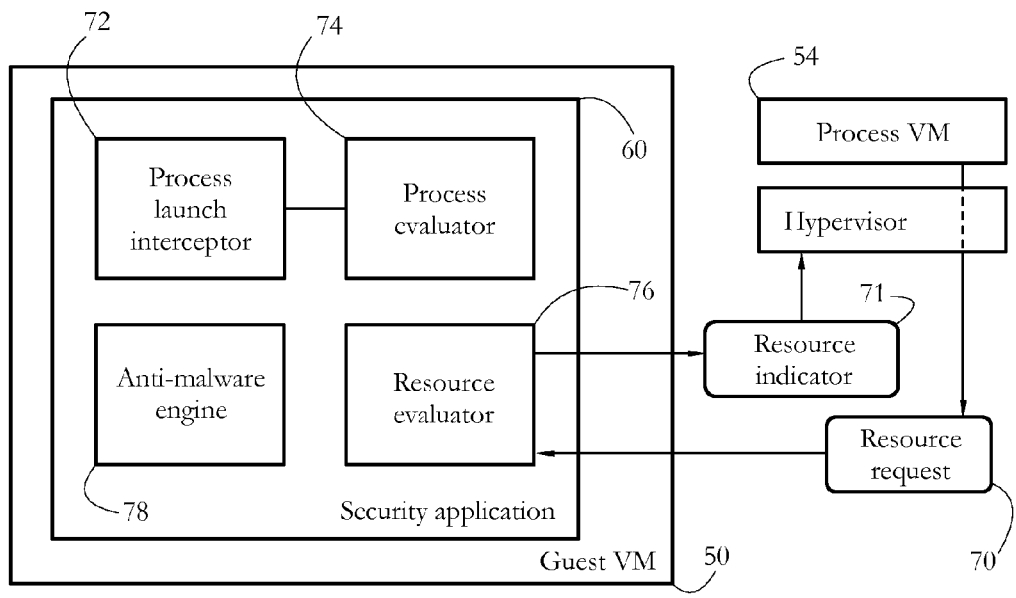
FIG. 5 shows exemplary components of a security application executing within the guest virtual machine according to some embodiments of the present invention.

FIG. 5 shows exemplary components of security application 60 executing within guest VM 50 according to some embodiments of the present invention. Application 60 includes a process launch interceptor 72, a process evaluator 74 connected to interceptor 72, a resource evaluator 76, and an anti-malware engine 78. The operation of components 72-74 is described in detail below. In some embodiments, resource evaluator 76 is configured to receive a resource request 70 from a process VM 54 (such as process VMs 54a-b in FIG. 1), to determine whether to grant process VM 54 access to the requested resource, and when access is granted, to instruct hypervisor 40 to expose the requested resource to the requesting process VM 54.

In some embodiments, anti-malware engine 78 is configured to determine whether a software object hosted by guest VM 50 or process VM 54 comprises malware. Exemplary software objects analyzed by engine 78 include a file and a content of a section of memory used by guest VM 50 or process VM 54. To determine whether the respective object contains malware, engine 78 may use any method known in the art of malware scanning, such as determining whether the object has a malware-indicative behavior, and/or matching a hash of a section of the respective object against a catalog of malware-indicative signatures. Some embodiments invoke engine 78 to scan a modified version of a file before committing the modifications to the disk, wherein such modifications are made by a target process executing within a process VM. More details of such operations are given below.

Figure 6:
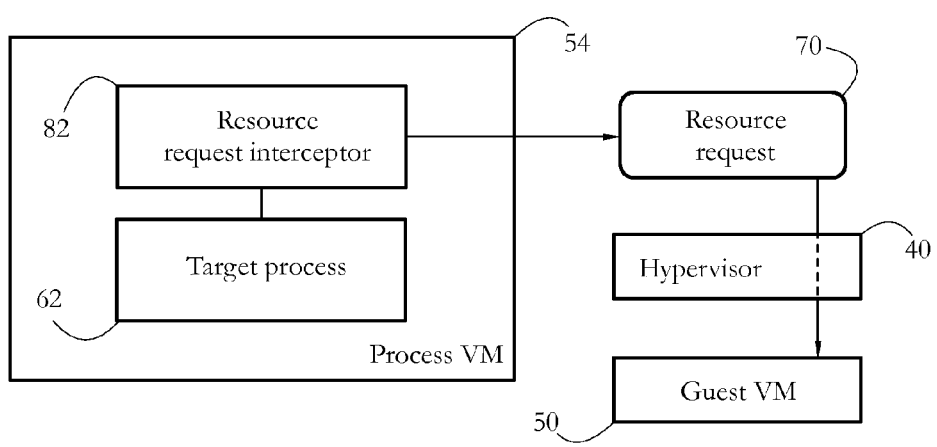
FIG. 6 shows exemplary software components executing within a process virtual machine according to some embodiments of the present invention.

FIG. 6 shows exemplary components executing within process VM 54. In some embodiments, process VM 54 is set up as a clone of template VM 52, and further contains a target process 62 (such as processes 62a-b in FIG. 1), and a resource request interceptor 82 configured to detect a resource request issued by the target process, to formulate resource request 70 and to send request 70 to guest VM 50. In some embodiments, process resources comprise data and/or services used by target process 62 during execution. Process resources may include, among others, files, registry key values, clipboard, and access to shared OS services (e.g. print spooler service). Resource files may include executable modules (such as dynamic-linked libraries—DLL in Windows®), as well as user files (such as image files, text documents, spreadsheets, HTML files, etc.).

In some embodiments, communication between guest VM 50 and process VM 54 is intermediated by hypervisor 40, as illustrated symbolically by the dashed line in FIGS. 5-6. Such communication may use any method known in the art of virtualization. For instance, to send resource request 70, process VM 54 may signal to hypervisor 40 by triggering a VM exit event (e.g., VMExit on Intel® platforms). Hypervisor 40 may determine according to a parameter (e.g., a reason) of the VM exit event that process VM 54 is requesting a resource, and may inject an interrupt into guest VM 50. The interrupt is processed by a handler executing within guest VM 50, the handler configured to read resource request 70. The actual data (payload) of resource request 70 may be placed by process VM 54, and subsequently read by guest VM 50, to/from a dedicated section of physical memory shared by guest VM 50 and process VM 54. To send data from guest VM 50 to process VM 54, an exemplary embodiment may write a resource indicator 71 into the shared section of memory and may trigger a VM exit from guest VM 50, to signal to hypervisor 40 that a resource is being transferred to process VM 54. Resource indicator 71 may include, among others, a memory address of the respective resource and a content of a data file, such as a DLL. Hypervisor 40 may then inject an interrupt into process VM 54 to signal VM 54 to access the respective resource.

FIG. 7 shows an exemplary sequence of steps performed by components of security application 60 within guest VM 50 to manage execution of a process according to some embodiments of the present invention. In steps 122-124, process launch interceptor 72 listens for the launch of a process within guest VM 50. A process is generically understood as an instance of a computer program, such as an application or a component of the operating system, and is characterized by having at least an execution thread and a section of virtual memory assigned to it by the operating system, the respective section comprising executable code. An application, such as application 58 in FIG. 1, may comprise multiple processes, but a process is not necessarily part of an application. Processes may be launched either in response to a user's action (for instance, the user clicking on an icon to launch an application such as Microsoft Word®), or unbeknownst to the user, for instance as part of program maintenance. Some processes (especially malware) may explicitly attempt to hide their launch and/or execution from the user, from certain components of the OS, and/or from anti-malware software.

Intercepting the launch of a process may be achieved by any method known in the art, for instance by hooking an OS function that carries out process management tasks. Execution of processes is typically overseen by the operating system, such overseeing including, among others, assigning virtual memory to each process, scheduling each process or thread thereof for execution, and maintaining a list of active processes. In one example, hooking an OS function configured to add a process to the list of active processes when the respective process is launched into execution may be used to notify process launch interceptor 72 about the respective launch. Interceptor 72 may further identify the process currently being launched according to a parameter passed to the respective hooked function. For example, in Windows®, each active process is described by a data structure known as an EPROCESS object, which includes, among others, a process ID uniquely identifying the respective process.

When a process launch has been detected, in a step 126, process evaluator 74 may evaluate the respective process (herein referred to as target process 62), to determine whether to allow process 62 to execute within the environment of guest VM 50 or to move the process to a dedicated, isolated environment of a process VM. In some embodiments, the decision whether to move the target process to a process VM is taken according to a security policy determined, for instance, by a system administrator. One exemplary policy may divide target processes into two categories, corresponding to trusted and untrusted processes, respectively. Members of the trusted category may be allowed to execute within guest VM 50, while members of the untrusted category may be automatically moved to a dedicated process VM. The policy may further designate a set of processes as trusted, and another set as untrusted, according to a set of criteria. In one such example, a pre-determined set of OS internals may be labeled as trusted, while browser processes and processes related to Microsoft Office® applications may be deemed untrusted.

In some embodiments, the decision whether to move target process 62 to a process VM is taken according to a probability that process 62 is malicious, the probability determined automatically by process evaluator 74 without explicit use of a policy or of an input from a human operator/system administrator. In one such example, step 126 may include calculating a maliciousness score for the target process, comparing the maliciousness score to a pre-determined threshold, and deciding to move the target process to a process VM when the maliciousness score exceeds the threshold. In some embodiments, the threshold may vary according to security settings set by a user of host system 10.

Some embodiments determine the maliciousness score heuristically, according to a set of criteria which may be static (i.e., referring to properties such as a type, a name, and a size of the respective process) and/or dynamic/behavioral (i.e., referring to an action performed by a previous instance of the respective process, like writing data to a disk or downloading data from the Internet). Several such methods are known in the art of malware detection. Multiple individual scores may be combined into an aggregate maliciousness score, wherein each individual score is determined according to a distinct criterion. Some individual scores may be malware-indicative, while other individual scores may not be malware-indicative per se, but may indicate maliciousness when combined with other individual scores.

Figure 8:
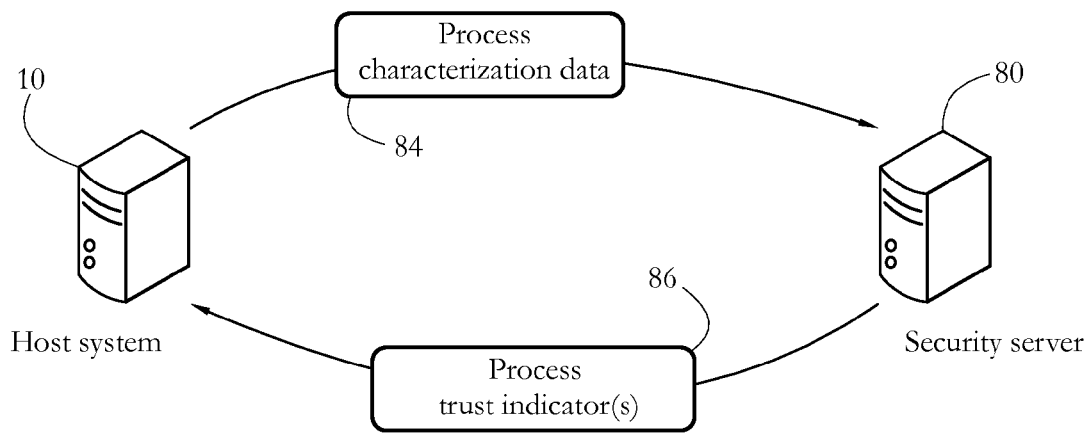
FIG. 8 illustrates an exemplary data exchange between the host system and a security server according to some embodiments of the present invention.

The maliciousness score may be determined according to local information and/or according to information aggregated remotely, for instance by a computer security company. In one such example, illustrated in FIG. 8, host system 10 may send to a remote security server 80 a set of process characterization data 84, comprising static and/or dynamic/behavioral data about processes executing on host system 10. Such data may arrive at server 80 from a multitude of host systems, allowing server 80 to gather a potentially comprehensive knowledgebase of process features, behaviors, and/or maliciousness scores. The data may be further processed using operator-assisted and/or automated methods such as neural networks and heuristic classifiers. In return, server 80 may send a set of process trust indicators 86 to each host system, indicators 86 allowing the process evaluator of each host system to determine whether to execute each process within a dedicated process VM. Trust indicators 86 may include, for instance, a maliciousness score determined for each process.

When process evaluator 74 determines that the target process should execute within guest VM 50, a step 130 (FIG. 7) allows the target process to execute. Otherwise, in a step 132, security application 60 may signal to hypervisor 40 to move the target process to a dedicated process VM. Step 132 may include suspending the execution of the target process, writing an indicator of the target process to a pre-determined memory section readable by hypervisor 40, and forcing a VM exit event to transfer control of the processor from guest VM 50 to hypervisor 40.

Figure 9:
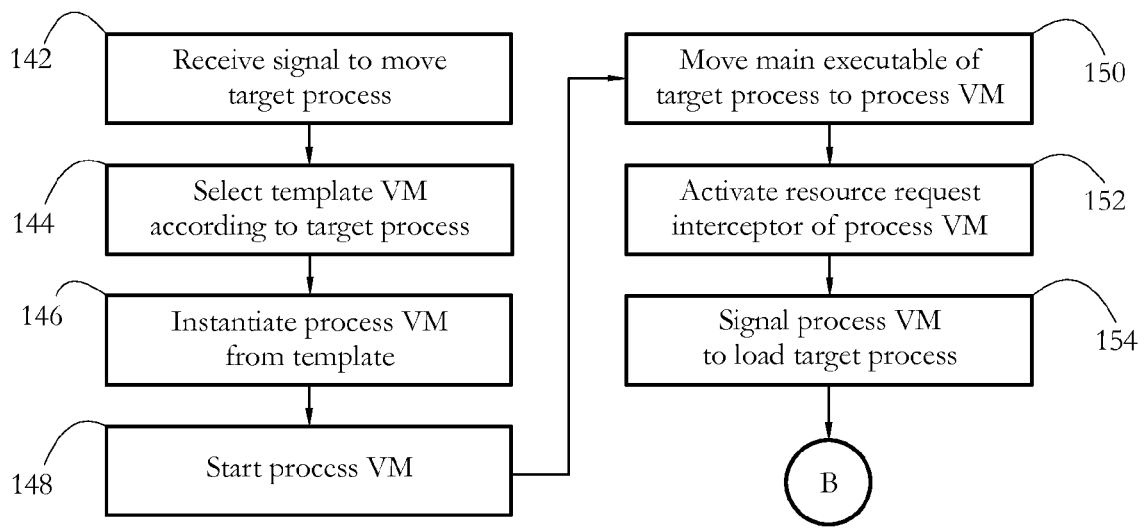
FIG. 9 shows an exemplary sequence of steps performed by the hypervisor to relocate a target process from the guest virtual machine to a dedicated process virtual machine according to some embodiments of the present invention.

FIG. 9 shows an exemplary sequence of steps performed by hypervisor 40 to relocate target process 62 to a dedicated process VM, according to some embodiments of the present invention. In a sequence of steps 144-146, hypervisor 40 instantiates process VM 54 from a template such as template VM 52 in FIG. 1. In embodiments that use a plurality of distinct template VMs, a suitable template may be selected from the plurality according to a type of target process (for instance, a template is used for browser processes, while a different template is used for a Microsoft Word® process). Step 146 may include allocating memory space for process VM 54 and copying memory mapping structures, internal state of virtualized devices (e.g., the register state and configuration of a virtual video adapter, the state of a virtualized interrupt controller, etc.), and template-specific data to a memory space of process VM 54. In some embodiments, cloning memory pages of template VM 52 to produce VM 54 uses a copy-on-write mechanism, so that modifications to VM 54 do not produce changes to template VM 52.

In a step 148, the newly instantiated process VM 54 is started. In embodiments wherein template VM 52 is configured with a booted OS, process VM 54 may start with an already running OS, to minimize latency and improve the user experience. A step 150 moves the main executable module of target process 62 (e.g., EXE file on Windows platforms) to process VM 54, for instance by mapping a copy of the respective module into the memory space of process VM 54. Alternatively, step 150 may include copying the main executable file of process 62 to process VM 54 and loading it locally. In a step 152, hypervisor 40 initializes and/or launches resource request interceptor 82 (see FIG. 6), and then launches target process 62 into execution (step 154). Execution then continues at the point labeled B in FIG. 10.

Figure 10:
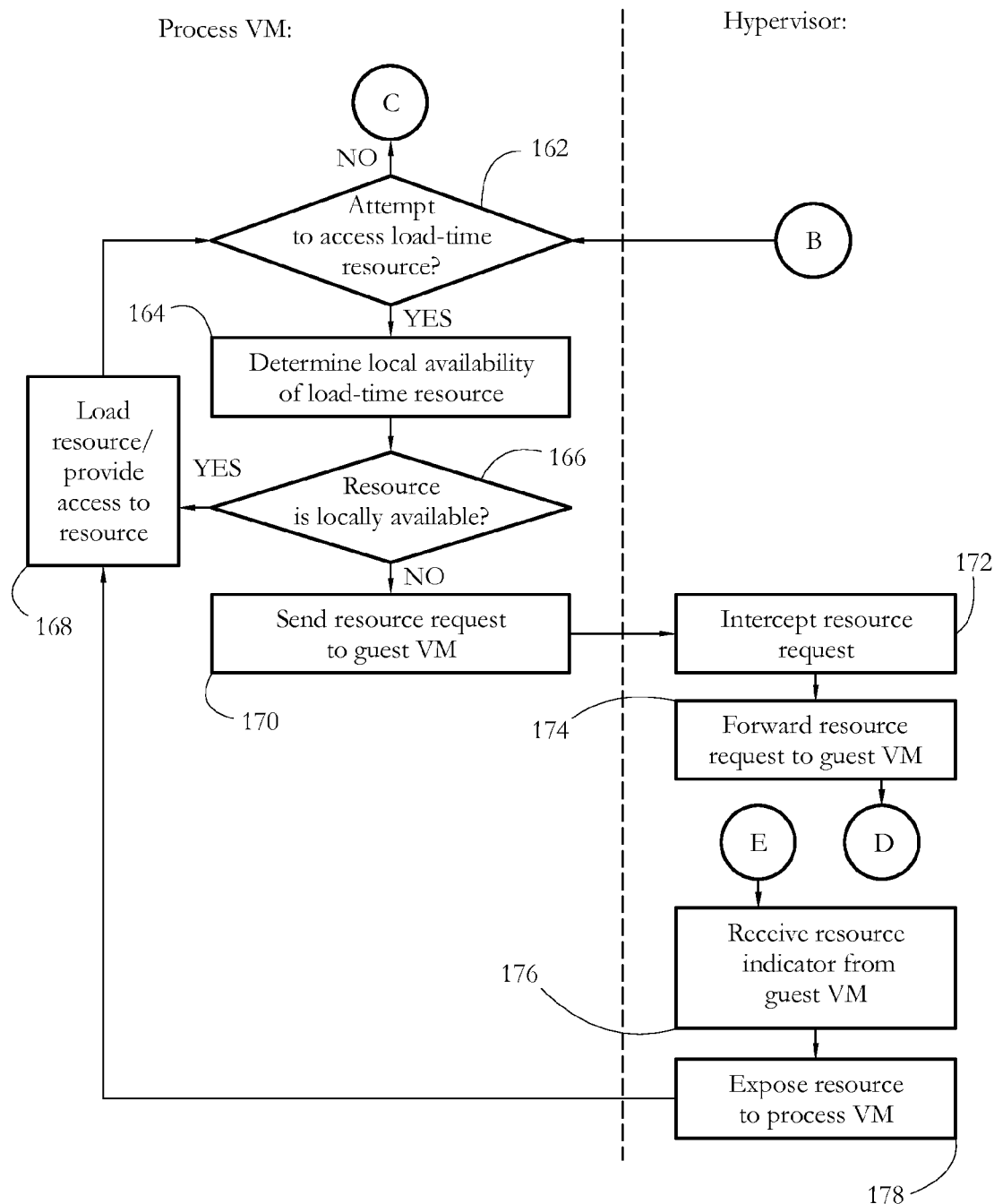
FIG. 10 illustrates an exemplary sequence of steps performed by components of the process virtual machine and/or the hypervisor to provide load-time resources to the target process according to some embodiments of the present invention.

FIG. 10 illustrates an exemplary sequence of steps performed by components of process VM 54 and/or hypervisor 40 to provide load-time resources to target process 62, according to some embodiments of the present invention. Following the launch of target process 62, in a step 162, resource request interceptor 82 listens for an attempt by a process loader component of the operating system to access a load-time resource of target process 62. In some embodiments, load-time resources include executable modules (such as dynamic-linked libraries—DLLs in Windows®) needed by the target process at launch time. In some embodiments, interceptor 82 may use a file system (FS) minifilter of the operating system of process VM 54 and/or a dedicated FS filter to intercept the attempt to access the respective DLL.

Figure 11:
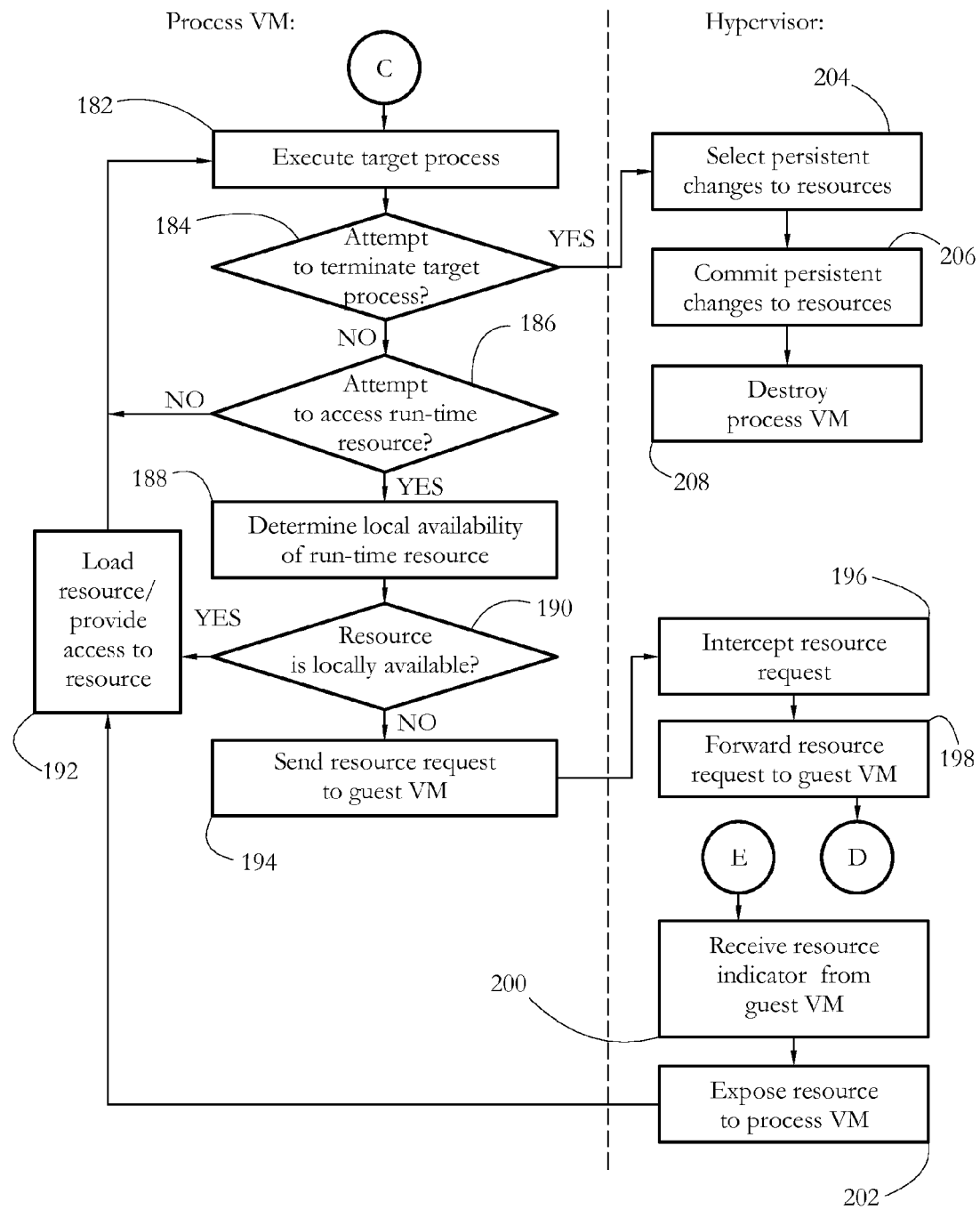
FIG. 11 illustrates an exemplary sequence of steps performed by components of the process virtual machine and/or the hypervisor during execution of the target process, according to some embodiments of the present invention.

When target process 62 does not need any load-time resources, or when all such resource needs have been satisfied, the operation of process VM 54 advances to a point labeled C in FIG. 11. When an attempt to access a load-time resource has been detected, a sequence of steps 164-166 determines whether the respective resource (e.g., DLL) is already present within the environment of process VM 54. When the resource is locally available, a step 168 loads the respective resource and/or provides access to the respective resource, and returns to step 162. When the resource is not locally available, hypervisor 40 may dynamically fetch the requested resource from guest VM 50 and expose it within process VM 54. An exemplary resource fetch proceeds as follows. In a step 170, resource request interceptor 82 may formulate resource request 70 including an indicator of the requested resource, and send request 70 to guest VM 50. In some embodiments, sending request 70 includes signaling hypervisor 40 to transmit request 70 to guest VM 50, for instance by writing a content of request 70 to a section of memory shared between process VM 54 and hypervisor 40, and forcing a VM exit event.

In steps 172-174, hypervisor 40 intercepts and forwards request 70 to guest VM 50. To signal guest VM 50 to receive resource request 70, hypervisor 40 may, for instance, place request 70 into a pre-determined section of memory accessible from within guest VM 50, and inject an interrupt into guest VM 50. An interrupt handler script within guest VM 50 may be configured to handle the respective interrupt by reading request 70 from the pre-determined section of memory.

In some embodiments, guest VM 50 processes the resource request as shown below in relation to FIG. 12 (sequence starting with label D). Guest VM 50 then sends a response including resource indicator 71 to process VM 54 (label E in FIG. 12). In steps 176-178, hypervisor 40 receives resource indicator 71 and exposes the respective resource to process VM 54. Exposing resources to process VM 54 may use any method known in the art of virtualization. When the respective resource is a file, hypervisor 40 may, for instance, write a copy of the respective file to a virtual storage device of process VM 54. Such straightforward copying may be preferred when the respective file has a relatively small size. An alternative method of exposure, preferred in the case of large files, comprises creating a container/placeholder for the respective file within the virtual storage of process VM 54, and communicating an indicator of the respective container (e.g., pointer, size, etc.) to target process 62. Hypervisor 40 may be further configured to intercept an attempt by target process 62 to access an address within the respective container, and may dynamically fetch a content of a section of the respective file from guest VM 50, the section corresponding to the respective address.

Some types of resources, such as user files (documents, images, email messages, etc.) may require further steps for retrieval from guest VM 50 into process VM 54. In some embodiments, in response to intercepting a resource request, hypervisor 40 may place an exclusive lock on the respective resource within guest VM 50. Such locking may be achieved, for instance, by controlling access to a section of memory and/or storage containing a part of the respective resource, and may serve to stop other processes from altering the respective resource during execution of target process 62. The respective resource may be unlocked after target process 62 finishes execution and saves persistent changes to the respective resource.

In some embodiments, exposing a resource to process VM 54 may further include configuring particular access rights to the respective resource. Such rights may be specified in resource indicator 71. For example, some files may be exposed as read-only, others as read/write, and others as execute-only. Other resources might be exposed initially as read-only, but may change to read/write after a first write attempt (for instance, as part of a copy-on-write mechanism). Such access rights may be set and enforced by hypervisor 40 using any method known in the art of virtualization, for instance by configuring a page table used by target process 62 and/or by other components executing within process VM 54 or guest VM 50.

An alternative method of exposing a resource to process VM 54 includes mapping the respective resource from a memory domain of guest VM 50 to the memory domain of process VM 54. Such mapping may comprise identifying a physical memory page containing a part of the respective resource, and configuring a page table used by process VM 54 (or by target process 62 executing within process VM 54), so that a virtual page within the memory domain of process VM 54 points to the respective physical page. The address of the physical page may be determined according to an address of a virtual page where the respective resource is located within the memory domain of guest VM 50. Such mapping of resources from one memory domain to the other may be performed for resources which are already loaded into memory, as well as for disk files which are memory-mapped.

FIG. 11 illustrates an exemplary sequence of steps performed by components of process VM 54 and/or hypervisor 40 during execution of target process 62. A sequence of steps 182-184-186 is executed in a loop until target process 62 finishes execution. Whenever target process 62 attempts to access a run-time resource, such as a user file, a registry value, a service, or a physical device of host system 10, steps 188-190 determine whether the respective run-time resource is locally available (i.e., is present within the virtual environment of process VM 54), and when yes, the respective resource is loaded and/or access to the respective resource is allowed. When the respective resource is not locally available, a sequence of steps 194-196-198-200-202 may fetch it on-demand from guest VM 50 and expose it within process VM 54. The operations required for fetching run-time resources may be similar to those needed to fetch load-time resources (for instance, steps described above, in relation to FIG. 10).

When target process 62 has ended, a component of process VM 54 may intercept an attempt to terminate target process 62, and notify hypervisor 40 (for instance, by triggering a VM exit event). In response, in a step 204, hypervisor 40 determines whether target process 62 has operated any persistent modifications to resources. In general, a process may make a great number of changes to its components and resources, but only a subset of these changes are persistent, i.e., need to be saved before the process is terminated. For instance, when using an instance of Microsoft Word®, the user may want to save changes made to a document. Similarly, a browser session may need to save changes made to bookmarks and/or cookies, among others. Persistent modifications may be identified according to a set of selection criteria. Additionally, step 204 may include displaying an interface to the user (e.g., "Save changes? Y/N") and receiving input from the user. After persistent modifications have been identified, a step 206 commits the respective modifications, for instance by copying the respective modifications to guest VM 50. In some embodiments, such modifications are scanned for malware by components of security application 60 (e.g., by anti-malware engine 78) before being written to the environment of guest VM 50.

Some embodiments destroy process VM 54 (step 208) after target process 62 has finished execution and all persistent modifications have been saved. Destroying VM 54 prevents transmission of code and/or data from an instance of VM 54 to another, and may thus stop malware from spreading from VM 54 to other software executing on host system 10. Step 208 may include, among others, erasing the content of memory pages allocated for process VM 54.

Figure 12:
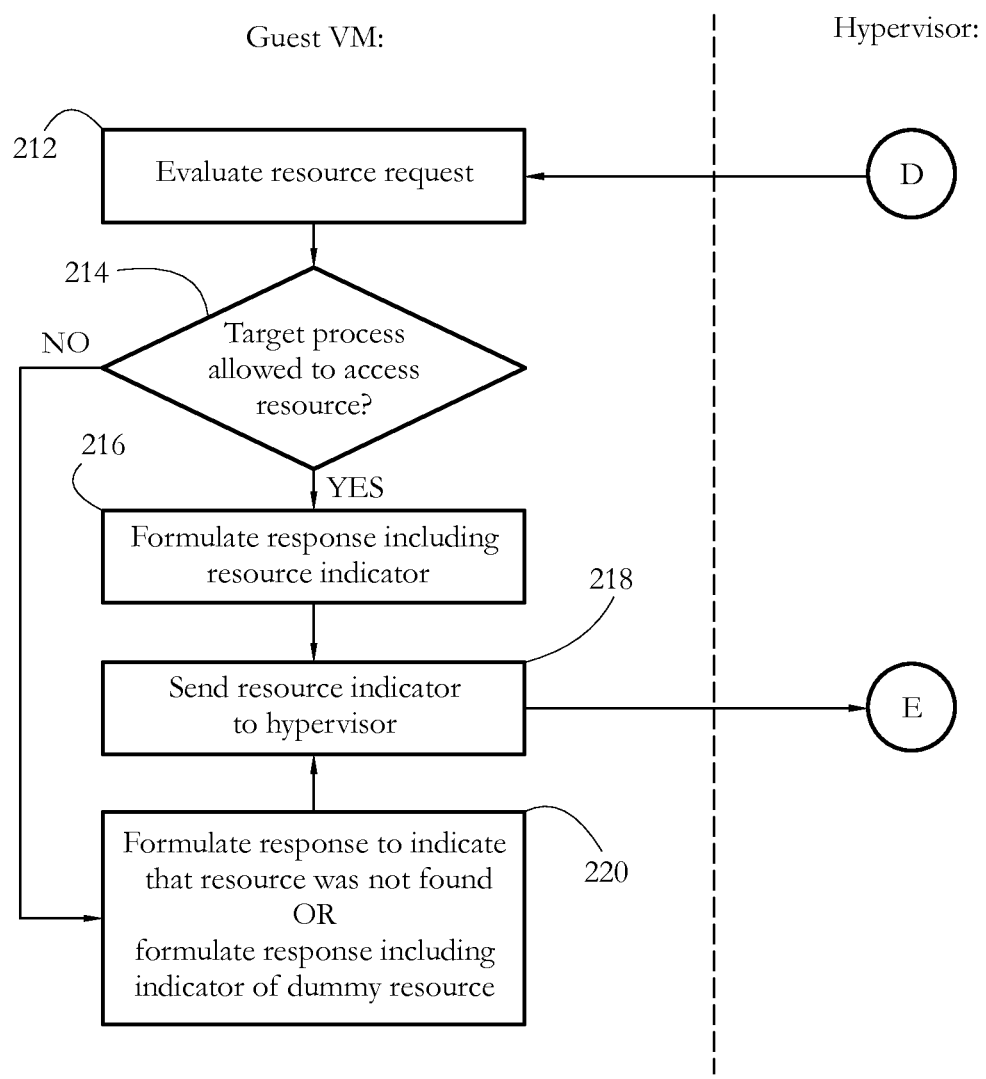
FIG. 12 shows an exemplary sequence of steps performed by components of the security application executing within the guest virtual machine to service a resource request received from a process virtual machine, according to some embodiments of the present invention.

FIG. 12 shows an exemplary sequence of steps performed by components of security application 60 to service a resource request received from process VM 54, according to some embodiments of the present invention. In response to receiving resource request 70 from process VM 54 (for example, via an interrupt injected by hypervisor 40), in steps 212-214 resource evaluator 76 (see e.g., FIG. 5) may evaluate the respective request to determine whether to grant process VM 54 access to the requested resource. Some resource requests may be legitimate, for instance, a browser process may need to access a network adapter to carry out its intended task. Other resource requests may be violating a security policy and/or may be suspicious of malice. Examples of such suspicious requests include a Word® process requesting to load a DLL that is part of another, unrelated application, and an email application trying to change critical registry keys of the OS. Request evaluation may therefore serve to enforce a security policy and/or to prevent possible malicious actions by software executing within process VM 54.

Evaluation of resource request may include an evaluation of the requested resource and/or an evaluation of target process 62. Such evaluations may proceed according to a predetermined policy, to a set of criteria, and/or to a maliciousness indicator determined for the respective target process and/or resource. Various such evaluation procedures are known in the art (see also discussion above, related to FIG. 7). As a result of the evaluation, resource evaluator 76 may decide either to grant or to deny access to the requested resource. When access is granted, a step 216 formulates a response including resource indicator 71 indicative of the requested resource. In some embodiments, resource indicator 71 further includes an indicator of a manner in which the respective resource should be exposed to process VM 54. In one such example, a requested file may be exposed in a read-only manner, a read/write manner, or an execute-only manner. In another example, indicator 71 may indicate whether a resource should be locked, so that no other process can use the respective resource for the duration of execution of target process 62. In yet another example, the requested resource may be exposed using a copy-on-write mechanism, wherein target process 62 is allowed to read and/or make changes to a copy of the respective resource. In a step 218, resource indicator 71 is sent to hypervisor 40, for instance by triggering a VM exit event.

When evaluator 76 decides to deny process VM 54 access to the requested resource, a step 220 may formulate a response indicating that the respective resource is not available (e.g., file not found, no network adapter installed, etc.). Alternatively, some embodiments may formulate a response indicating a dummy resource configured to mimic the actual resource requested by target process 62. Examples of such dummy resources include, among others, an empty clipboard, an empty file, and a registry key with a default value.

The exemplary systems and methods described above allow protecting a host system, such as a computer system or smartphone, from malware such as viruses, exploits, and rootkits. In some embodiments of the present invention, installing a security application on the host system launches a hypervisor executing at the highest processor privilege level, and displaces the operating system to a guest virtual machine. The anti-malware application then collaborates with the hypervisor to configure a set of template virtual machines, wherein each such template virtual machine may be configured to execute a particular class or category of processes and/or applications (e.g., browser, word processor, email reader). The security application detects the launch of a target process within the guest VM, and may instruct the hypervisor to relocate the respective process to a dedicated virtual machine. When such relocation is called for, the hypervisor instantiates a process VM based on one of the template VMs configured in the initialization phase, suspends execution of the target process in the guest VM and moves the target process to the respective process VM. Each such process VM operates with a virtualized memory space isolated from the virtualized memory space of another process VM, and isolated from the virtualized memory space of the guest VM. Memory isolation is enforced using hardware virtualization techniques, for instance exposing distinct page tables to each process VM and to the guest VM. Such page tables may include second-level address translation (SLAT) tables, such as extended page tables (EPT) on Intel® platforms.

In conventional computer systems, each software object executes within a memory domain partially accessible to the operating system and/or to other software objects. Such configurations may be particularly vulnerable to malware, since a successful attack on one software object may compromise other objects, most notably, important components of the operating system. In contrast, some embodiments of the present invention limit the damage of a possible malware attack by relocating some processes to the isolated environment of a dedicated virtual machine. In the eventuality of a successful malware attack on the respective process, any memory contamination is contained to the respective virtual machine and does not spread to the operating system or other applications. The respective virtual machine may then be safely destroyed without affecting the integrity of the host.

During execution, a process may need a set of resources, such as code libraries (e.g., DLL in Windows®), user files, various OS registry values, and access to hardware devices (e.g., input, output, network), among others. In some embodiments, when a process that was relocated to a process VM requires such a resource, an instance of the respective resource is fetched on-demand, from the guest VM to the respective process VM. Such resource fetching may be carried out in part by the hypervisor, which may, for instance, copy data from the guest VM to the process VM.

Executing a large number of virtual machines concurrently may place a substantial burden on the computational resources of a host system. Fully-featured virtual machines, configured with a complete operating system and a large set of virtualized hardware devices may be especially expensive to operate, in terms of memory requirements and CPU cycles. For this reason, some embodiments of the present invention use minimal virtual machines instead of fully-featured virtual machines as hosts for each target process. Such minimal virtual machines may lack most of the features of the guest VM, and may be intentionally configured with a minimal set of resources needed to execute a particular class or category of software (e.g., browser processes). When a target process executing within such an environment requires a resource which is not available in the current configuration of the process VM, the respective resource may be fetched on-demand from the fully-featured guest VM.

It will be clear to one skilled in the art that the above embodiments may be altered in many ways without departing from the scope of the invention. Accordingly, the scope of the invention should be determined by the following claims and their legal equivalents.

What is claimed is:

1. A host system comprising at least one processor configured to execute a hypervisor, the hypervisor configured to expose a guest virtual machine (VM) and further configured to:
   in response to a launch of a target process within the guest VM, expose a process VM distinct from the guest VM, the process VM comprising a resource request interceptor configured to:
     detect an attempt by the target process to access a resource, and
     in response to detecting the attempt, transmit an indicator of the resource to the hypervisor;
   in response to exposing the process VM, relocate the target process from the guest VM to the process VM; and
   in response to relocating the target process, and in response to receiving the indicator of the resource, fetch the resource from the guest VM to the process VM.

2. The host system of claim 1, wherein the resource comprises a disk file.

3. The host system of claim 1, wherein the resource comprises a registry key.

4. The host system of claim 1, wherein fetching the resource comprises copying the resource from the guest VM to the process VM.

5. The host system of claim 1, wherein fetching the resource comprises mapping the resource from a memory domain of the guest VM to a memory domain of the process VM.

6. The host system of claim 1, wherein fetching the resource comprises configuring access rights to the resource within the guest VM.

7. The host system of claim 1, wherein fetching the resource comprises locking the resource within the guest VM so that the target process has exclusive access to the resource for the lifetime of the target process.

8. The host system of claim 1, wherein the guest VM is configured, in response to the attempt to access the resource, to:
   evaluate the resource and the target process to determine whether accessing the resource by the target process violates a predetermined security policy; and
   in response, when accessing the resource by the target process does not violate the security policy, to send an indicator of the resource to the hypervisor.

9. The host system of claim 1, wherein the guest VM is configured, in response to the attempt to access the resource, to:
   evaluate the resource and the target process according to a set of malware-identifying criteria to determine whether accessing the resource by the target process is indicative of malice; and
   in response, when accessing the resource by the target process is not indicative of malice, to send an indicator of the resource to the hypervisor.

10. The host system of claim 1, wherein:
    the hypervisor is further configured to:
      detect an attempt to terminate the target process,
      in response, identify a modification to the resource, the modification operated during execution of the target process, and
      in response to identifying the modification, send the modification to the guest VM; and
    the guest VM is configured to:
      in response to receiving the modification, determine whether the modification comprises malware, and
      when the modification does not comprise malware, save the modification to a storage device used by guest VM.

11. A method comprising:
    employing at least one processor of a host system to execute a hypervisor, the hypervisor configured to expose a guest virtual machine (VM);
    in response to a launch of a target process within the guest VM, employing the at least one processor to expose a process VM distinct from the guest VM, the process VM comprising a resource request interceptor configured to:
      detect an attempt by the target process to access a resource, and
      in response to detecting the attempt, transmit an indicator of the resource to the hypervisor;
    in response to exposing the process VM, employing the at least one processor to relocate the target process from the guest VM to the process VM; and
    in response to relocating the target process, and in response to the hypervisor receiving the indicator of the resource, employing the at least one processor to fetch the resource from the guest VM to the process VM.

12. The method of claim 11, wherein the resource comprises a disk file.

13. The method of claim 11, wherein the resource comprises a registry key.

14. The method of claim 11, wherein fetching the resource comprises copying the resource from the guest VM to the process VM.

15. The method of claim 11, wherein fetching the resource comprises mapping the resource from a memory domain of the guest VM to a memory domain of the process VM.

16. The method of claim 11, wherein fetching the resource comprises configuring access rights to the resource within the guest VM.

17. The method of claim 11, wherein fetching the resource comprises locking the resource within the guest VM so that the target process has exclusive access to the resource for the lifetime of the target process.

18. The method of claim 11, further comprising, in response to the attempt to access the resource:
    employing the at least one processor to evaluate the resource and the target process to determine whether accessing the resource by the target process violates a predetermined security policy; and
    in response, when accessing the resource by the target process does not violate the security policy, employing the at least one processor to send an indicator of the resource to the hypervisor.

19. The method of claim 11, further comprising, in response to the attempt to access the resource:
    employing the at least one processor to evaluate the resource and the target process according to a set of malware-identifying criteria to determine whether accessing the resource by the target process is indicative of malice; and in response, when accessing the resource by the target process is not indicative of malice, employing the at least one processor to send an indicator of the resource to the hypervisor.

20. The method of claim 11, further comprising:

employing the at least one processor to detect an attempt to terminate the target process;

in response to detecting the attempt to terminate the target process, employing the at least one processor to identify a modification to the resource, the modification operated during execution of the target process;

in response to identifying the modification, employing the at least one processor to determine whether the modification comprises malware; and in response, when the modification does not comprise malware, employing the at least one processor to save the modification to a storage device used by the guest VM.

21. A non-transitory computer readable medium storing instructions which, when executed, cause a host system comprising at least one processor to execute a hypervisor, the hypervisor configured to expose a guest virtual machine (VM) and further configured to:

in response to a launch of a target process within the guest VM, expose a process VM distinct from the guest VM, the process VM comprising a resource request interceptor configured to:

detect an attempt by the target process to access a resource, and in response to detecting the attempt, transmit an indicator of the resource to the hypervisor;

in response to exposing the guest VM, relocate the target process from the guest VM to the process VM; and in response to relocating the target process, and in response to receiving the indicator of the resource, fetch the resource from the guest VM to the process VM.

22. A host system comprising at least one processor configured to execute a hypervisor, the hypervisor configured to expose a guest virtual machine (VM) and a process VM, and further configured to:

in response to a launch of a target process within the guest VM, relocate the target process from the guest VM to the process VM;

in response to relocating the target process, and in response to receiving from the process VM a request to access a resource, transmit the request to the guest VM;

in response to transmitting the request to the guest VM, receive from the guest VM an indicator of the resource; and in response to receiving the indicator of the resource, fetch the resource from the guest VM to the process VM, wherein the guest VM comprises an evaluating module configured to:

in response to receiving the request from the process VM, evaluate the resource and the target process to determine whether accessing the resource by the target process poses a computer security threat, and in response, when accessing the resource by the target process does not pose a computer security threat, transmit the indicator of the resource to the hypervisor.

* * * * *